United States Patent [19]

Frihart et al.

[11] Patent Number: 6,022,947
[45] Date of Patent: Feb. 8, 2000

[54] LIGHT-COLORED, LOW MOLECULAR WEIGHT PHENOLIC-MODIFIED ROSIN ESTERS

[75] Inventors: Charles R. Frihart, Lawrenceville, N.J.; Kenneth E. Krajca; Brett A. Neumann, both of Savannah, Ga.

[73] Assignee: Union Camp Corporation, Wayne, N.J.

[21] Appl. No.: 09/156,337

[22] Filed: Sep. 18, 1998

[51] Int. Cl.[7] .................................. C09F 1/02; C09F 1/04
[52] U.S. Cl. .................. 530/212; 530/213; 530/215; 530/216; 530/218; 530/219; 528/86; 528/167; 528/171; 528/176; 528/211; 156/327; 156/335; 525/54.4
[58] Field of Search ..................... 530/212, 213, 530/215, 216, 218, 219; 528/86, 167, 171, 176, 211; 156/327, 335; 525/54.4

[56] References Cited

U.S. PATENT DOCUMENTS

| | | |
|---|---|---|
| 1,623,901 | 4/1927 | Amann et al. . |
| 1,923,507 | 8/1933 | Rosenblum . |
| 1,988,353 | 1/1935 | Hönel . |
| 2,007,983 | 7/1935 | Rosenblum . |
| 2,081,153 | 5/1937 | Rosenblum . |
| 2,084,203 | 6/1937 | Kneale et al. . |
| 2,311,200 | 2/1943 | Auer . |
| 4,002,585 | 1/1977 | Oishi et al. . |
| 4,391,640 | 7/1983 | Okoshi et al. . |
| 4,398,016 | 8/1983 | Homma et al. ................ 528/158.5 |
| 4,744,925 | 5/1988 | Lampo et al. . |
| 4,857,624 | 8/1989 | DeBlasi et al. ................ 528/129 |
| 5,162,496 | 11/1992 | Johnson, Jr. .................. 530/212 |
| 5,177,133 | 1/1993 | Peck et al. .................... 524/139 |
| 5,405,932 | 4/1995 | Bender et al. ................. 528/104 |
| 5,830,992 | 11/1998 | Whalen ......................... 530/215 |

OTHER PUBLICATIONS

Union Camp. Uni–Rez® Product Data, "Uni–Rez® 9200 Phenolic Modified Resin," Union Camp Corporation • Chemical Products Division, Sep. 1994, 2 pages.

*Primary Examiner*—Nathan M. Nutter
*Attorney, Agent, or Firm*—Seed and Berry LLP

[57] ABSTRACT

Light-colored phenolic-modified rosin esters, suitable for use as, for example, tackifiers in adhesive compositions, are prepared by reacting together rosin, a phenolic compound, formaldehyde or a reactive equivalent thereof, and a non-phenolic hydroxyl-containing organic compound in the presence of at least one lightening agent selected from phenol sulfide compounds, phosphorous acid, esters of phosphorous acid, and hypophosphite salts. The formaldehyde or reactive equivalent is present in an amount ranging from about 1.1 to about 3.5 equivalents of —CHO moieties per 1 equivalent of Ar—OH moiety of the phenolic compound, in order to obtain rosin esters having desirably low color, and adequately low molecular weight to effectively function as tackifiers.

28 Claims, No Drawings

LIGHT-COLORED, LOW MOLECULAR WEIGHT PHENOLIC-MODIFIED ROSIN ESTERS

TECHNICAL FIELD OF THE INVENTION

The present invention is related to resinous compositions, and more specifically relates to rosin-containing resins and adhesives containing same.

BACKGROUND OF THE INVENTION

The reaction products of rosin, polyhydric alcohols, formaldehyde and phenols (hereinafter "phenolic-modified rosin esters") have been known for over 60 years. See, e.g., U.S. Pat. No. 2,007,983 to Rosenblum. They are typically prepared by the reaction of rosin (a mixture of isomeric $C_{20}$ tricyclic mono-carboxylic acids) with a formaldehyde-containing compound, and a phenolic compound. This phenolic resin is then esterified with a polyhydric alcohol (hereinafter "polyol") providing the phenolic-modified rosin esters. These materials are typically dark colored and of moderately high molecular weight. Phenolic-modified rosin esters currently find widespread commercial use as binders for offset printing inks. See, e.g., Roger E. Burke, "Rosin-based Printing Inks", *Naval Stores*, Chapter 10. Pulp Chemicals Association (1989).

The prior art contains numerous description of phenolic-modified rosin esters which are reportedly useful in offset printing inks. Exemplary are U.S. Pat. No. 4,398,016 to Homma et al. and U.S. Pat. No. 4,391,640 to Okoshi et al., which are both directed to processes for producing phenolic-modified rosin esters, which are further modified with an animal or vegetable oil. U.S. Pat. No. 4,002,585 to Oishi et al. discloses a reaction product of rosin, an α,β-ethylenically unsaturated carboxylic acid-modified petroleum resin, a resole-type phenol-formaldehyde pre-condensate and a polyhydric alcohol having a high softening point and high solubility in a hydrocarbon solvent. U.S. Pat. No. 4,857,624 to DeBlasi at al relates to a reportedly inexpensive process for producing a phenolic-modified rosin ester which exhibits high hold-out, excellent printability and excellent reducibility. U.S. Pat. No. 4,744,925 relates to a method of preparing esters of rosin, wherein rosin and polyhydric alcohol are reacted in the presence of phosphinic acid and a phenol sulfide compound, as combined catalyst, to reduce the reaction time for ester formation and to provide a rosin ester of improved color and oxidative stability; however, no particular utility is reported for the rosin esters disclosed in the '925 patent.

Phenolic-modified rosin esters are seldom employed as tackifiers. In part, this is probably due to the very dark color and high molecular weight of phenolic-modified rosin esters. Currently, rosin esters (made without phenol or formaldehyde modification) and terpene phenolics (made from terpenes and phenols) are commercially used as tackifiers, and these materials have colors, as measured on the Gardner scale, of less than about 6, where lower numbers correspond to lighter-colored resins. In contrast, phenolic-modified rosin esters typically have Gardner colors in excess of 10. Thus, color alone effectively precludes phenolic-modified rosin esters from being employed as commercially viable tackifiers.

In addition, since phenolic-modified rosin esters have been primarily developed for use in offset printing inks, a critical property for these esters is oil solubility. Offset printing inks contain a large amount of hydrocarbon solvent, and therefore the binder resins must have good solubility in these solvents. This particular property is largely irrelevant for a tackifier resin.

There is a continuing need for new and improved tackifier resins, which meet the basic requirements of low color, good compatibility with elastomers, and reasonable manufacturing costs. The present invention fulfills this need and provides related advantages as described herein.

SUMMARY OF THE INVENTION

In one aspect, the present invention provides a process for preparing a light-colored phenolic-modified rosin ester. The process includes the step of reacting together reactants including rosin, a phenolic compound, formaldehyde or a reactive equivalent thereof, and a non-phenolic hydroxyl-containing organic compound. The step of reacting is conducted in the presence of at least one lightening agent selected from phenol sulfide compounds, phosphorous acid, esters of phosphorous acid, and hypophosphite salts. The reactants are combined such that the formaldehyde or reactive equivalent thereof is present, i e., charged to the reaction flask, in an amount ranging from about 1.1 to about 3.5 equivalents of —CHO moieties per 1 equivalent of Ar—OH moiety of the phenolic compound. In one embodiment, the process further includes the step of mixing at least one of an antioxidant or a UV stabilizer with the light-colored phenolic-modified rosin ester. The invention also provides for light-colored phenolic-modified rosin esters prepared by this process.

In another embodiment, the present invention provides an adhesive which contains an adhesive polymer and a light-colored phenolic-modified rosin ester as described above.

DETAILED DESCRIPTION OF THE INVENTION

The present invention provides a process for preparing a light-colored phenolic-modified rosin ester, and further provides the rosin ester prepared by the described process. The inventive process includes the step of reacting together various reactants. The reactants include, at a minimum, rosin, phenolic compound, formaldehyde or a reactive equivalent thereof, and non-phenolic hydroxyl-containing organic compound. The reaction is conducted in the presence of a lightening agent. The relative amounts of the reactants are selected with a view toward providing a rosin ester having little or no coloration, and a desirably low molecular weight. A suitable range of molecular weights is obtained when the formaldehyde or reactive equivalent is present among the reactants in an amount ranging from about 1.1 to about 3.5 equivalents of —CHO moieties per each I equivalent of Ar—OH moiety of the phenolic compound. This range is also suitable for obtaining phenolic-modified rosin esters of light color. Before describing the process in further detail, the various reactants will be discussed.

The rosin useful in the present invention is the standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used as the "rosin" of the invention.

Rosin which is suitable for use in the present invention can be obtained from many sources, and can have a wide range of purities. For example, wood rosin may be employed in the present invention, where wood rosin is obtained from Pinus stumps after harvesting the stumps, chipping the stumps into small chips, extracting the chips with hexane or higher-boiling paraffin, and distilling the hexane or paraffin to yield wood rosin. Gum rosin, which is the name given to rosin that is obtained after scoring a pine tree, collecting the exudate sap, and then distilling away the volatile components, may also be employed in the invention.

The rosin may be tall oil rosin, which is a by-product of the Kraft (i.e., sulfate) pulping process for making paper. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. This tall oil rosin may be used in the present invention. Depending on the fractionation conditions, the rosin may contain variable amounts of fatty acids. Preferably, the rosin used in the present invention contains at least 90 wt % resin acids, and less than 10 wt % fatty acids. Some rosin dimerization product, which may form during the fractionation process, may also be present in the tall oil rosin.

Rosin may also be characterized by its Gardner color, where lower Gardner color numbers indicate lighter-colored rosin. Light-colored rosin is generally preferred for preparation of prior art rosin ester tackifiers, and is also generally preferred for the light-colored phenolic-modified rosin esters of the present invention. Light colored rosin may be prepared by careful fractionation of rosin from crude tall oil, e.g., by conducting the distillation in the presence of an inert atmosphere, and/or minimizing the temperature of the distillation.

Alternatively, or in addition, the rosin may be further refined by, e.g., crystallization or extraction. Crystallization may be achieved by dissolving the rosin in a "good" solvent to provide a concentrated solution thereof, then adding "poor" solvent to the solution, where the poor solvent causes the rosin to crystallize from the solution. Examples of good solvents include, without limitation, aromatic solvents such as benzene, toluene and xylene, chloroform, ketones such as acetone, and lower alcohols such as methanol and ethanol. Hydrocarbons are an example of a poor solvent, where hydrocarbons include, without limitation, cyclohexane, hexanes, isooctane and the like. Extraction typically consists of dissolving the resin acids in aqueous alkali, separating undissolved material(s) by, for example, extraction with a water-immiscible organic solvent, then acidifying the aqueous phase to regenerate the resin acids.

The rosin may also be so-called "stabilized" rosin, where stabilized rosin is obtained by treating standard grade rosin by one or both of dehydrogenation and disproportionation. Disproportionated rosin may be prepared by heating rosin at about 100–300° C. for a time period ranging from about 30 minutes to 6 hours, in the presence of a disproportionation catalyst. The precise time period depends on the heating temperature and the selection and amount of disproportionation catalyst. Suitable catalysts for the disproportionation include, without limitation, supported or non-supported palladium, nickel, and platinum; iodine; iodides such as iron iodide; sulfur dioxide; and sulfides such as iron sulfide. Typically, the disproportionation catalyst is employed in an amount ranging from 0.01 to 5% by weight, based on the amount of rosin employed.

Dehydrogenation of rosin may be achieved by heating rosin in a sturdy reaction vessel, in the presence of a dehydrogenation catalyst. Typical elevated temperatures suitable for dehydrogenation are in the range of about 100–300° C. Typical dehydrogenation catalysts include, without limitation, palladium, rhodium and platinum metals. These metals may be supported on a solid support, where silica, alumina and carbon are suitable solid supports. An amount of dehydrogenation catalyst ranging from 0.01 to 5% by weight, based on the amount of rosin employed, is typically suitable.

However, in order to minimize the cost of the light-colored phenolic-modified rosin ester, the rosin is preferably not subjected to extensive purifying or modifying processes. Thus, for reasons of economy, in a preferred embodiment of the invention, the rosin is "standard" grade rosin as is readily available from many commercial distillers of naval stores. This standard grade rosin has not been subjected to disproportionation, dehydrogenation or hydrogenation processes prior to its use in the reaction of the present invention. The standard grade of rosin has also not undergone any special crystallization procedures to remove impurities.

A preferred standard grade of rosin is available commercially from Union Camp Corporation (Wayne, N.J.) under the UNITOL® trademark. Gum rosin, including Chinese gum rosin, is another preferred rosin for preparing light-colored phenolic-modified rosin esters of the invention. Whether of purified or standard grade, the rosin will typically have an acid number in the range of 160–190.

A phenolic compound according to the invention has at least one hydroxyl group directly bonded to an aromatic ring. The parent phenolic compound is phenol itself. Other phenolic compounds are derivatives of phenol wherein 1 to 3 of the aromatic hydrogens are replaced with an equal number of substituents independently selected from hydroxyl; $C_1$–$C_{12}$alkyl; $C_1$–$C_{12}$alkyl substituted with 1 or 2 groups selected from hydroxyl and phenyl; phenyl; and phenyl substituted with 1 or 2 groups selected from hydroxyl and $C_1$–$C_{12}$alkyl.

Specific derivatives of phenol include (unless otherwise stated, any two substituents may be in the ortho, meta or para relationship) cresols (including the ortho, meta and para cresols), 1,3,5-xylenols, iso-propylphenol, tert-butylphenol, amylphenol, octylphenol, nonylphenol, diphenylolpropane, phenylphenol, resorcinol, cashew nutshell liquid, bisphenol-A and cumylphenol. Preferred phenolic compounds have a single substituent in the para position (relative to the hydroxyl group), and include p-tert-butylphenol, p-octylphenol and p-nonylphenol. In one preferred embodiment, the phenolic compound is selected from phenol, $C_{1-22}$alkylphenol and bisphenol-A.

The resins of the invention are prepared using formaldehyde (chemical formula $CH_2O$) or a reactive equivalent thereof. The formaldehyde or reactive equivalent thereof may serve to chemically link the phenolic compound with the rosin. Since formaldehyde is a gas at room temperature and ambient pressure, it is somewhat difficult to work with in a laboratory or commercial setting. Accordingly, use of a reactive equivalent thereof, such as a formaldehyde-generating compound in either liquid or solid form, is a preferred manner to introduce formaldehyde into a chemical reaction. For example, formaldehyde may be dissolved in water, where it forms "formalin", of chemical formula $HO(CH_2O)_nH$, where n is roughly 2. Formalins having both 36 wt % and 50 wt % formaldehyde activity are commercially available, and may be used in the practice of this invention.

A preferred reactive equivalent of formaldehyde is paraformaldehyde, which is sometimes referred to in the art simply as paraform. Paraformaldehyde is a solid, water-free oligomer or polymer of formaldehyde. Paraformaldehyde has the chemical formula HO(CH$_2$O)$_n$H wherein n is on the order of 20 to 100. Paraformaldehyde is commercially available from many sources, including Celanese (Dallas, Tex.). Other, less preferred sources of formaldehyde include trioxane and hexamethylenetetramine. Trioxane and hexamethylenetetramine are less preferred because their use necessitates special equipment and handling conditions in order to release formaldehyde activity from these chemicals.

The non-phenolic hydroxyl-containing organic compound may also be referred to as a hydric compound. The term "non-phenolic" is incorporated into the term "non-phenolic hydroxyl-containing compounds" in order to distinguish these compound from the "phenolic compounds" (which also have a hydroxyl group) as described above. The non-phenolic hydroxyl-containing compound is an organic compound having at least one hydroxyl (—)H) group. These compounds may be monohydric (i.e., contain 1 and only 1 hydroxyl group), or polyhydric (i.e., contain more than 1 hydroxyl group), where dihydric (2 and only 2 hydroxyl groups) and trihydric (3 and only 3 hydroxyl groups) compounds are exemplary polyhydric compounds. The non-phenolic hydroxyl-containing compound of the invention may be selected from C$_1$–C$_{22}$monohydric compounds, C$_2$–C$_{36}$dihydric compounds, C$_3$–C$_{36}$trihydric compounds, C$_5$–C$_{36}$tetrahydric compounds, C$_5$–C$_{36}$pentahydric compounds and C$_6$–C$_{36}$hexahydric compounds. Each hydroxyl group is preferably primary, that is, attached to a carbon bearing two hydrogen atoms, or, less preferably, secondary, that is, attached to a carbon bearing only one hydrogen atom. Tertiary hydroxyl groups are not preferred in the practice of this invention because they are typically unstable when subjected to the high temperature conditions required for ester formation.

Some non-limiting examples of C$_1$–C$_{22}$monohydric compounds include methanol, ethanol, n-propanol, n-butanol, n-hexanol, 2-ethylhexanol, n-decanol, n-dodecanol, and n-hexadecanol. C$_2$–C$_{36}$dihydric compounds include ethylene glycol, propylene glycol, neopentyl glycol, diethylene glycol, triethylene glycol, 1,4-butanediol, 1,6-hexanediol, 1,4-cyclohexanedimethanol, and the like, which have primary hydroxyl groups. Some non-limiting examples of C$_3$–C$_{36}$trihydric compounds include glycerol, trimethylolpropane, trimethylolethane and the like, including primary and/or secondary hydroxyl groups. Pentaerythritol and sugars are essentially the only commercially available, reasonably priced C$_5$–C$_{36}$tetrahydric compounds, however other tetrahydric compounds could be used in the invention. Dimerized trimethylolpropane and sugars are some of the C$_5$–C$_{36}$pentahydric compounds that could be used in the invention, while dimerized pentaerythritol (also known as dipentaerythritol) is a preferred example of a C$_6$–C$_{36}$hexahydric compound.

A preferred non-phenolic hydroxyl-containing organic compound is a linear chain of 2–8 carbon atoms having one hydroxyl group at each termini, i.e., a linear C$_2$–C$_8$dihydric compound. 1,2-Ethylenediol (ethylene glycol), 1,4-butanediol, 1,6-hexanediol, and 1,8-octanediol are exemplary linear C$_2$–C$_8$dihydric compounds of this invention. In another preferred embodiment, the non-phenolic hydroxyl-containing organic compound is one or more of glycerine, pentaerythritol, trimethylolpropane, dimethylolethane, dipentaerythritol, neopentylglycol, cyclohexanedimethanol, ethylene glycol, diethylene glycol, triethylene glycol, and diols of the formula HO—linearC$_{2-36}$alkylene—OH. One or more polyhydric compounds may be used in the preparation of the light-colored phenolic-modified rosin esters of the invention.

The reactants used to prepare the light-colored phenolic-modified rosin esters of the present invention are combined, and react together, in the presence of a lightening agent. The lightening agent typically serves, in one capacity, to provide for a lighter colored product than would be obtained were the same reaction run in the absence of the lightening agent. While the lightening agent may also provide other advantageous effects, e.g., a faster reaction rate, a more stable product, etc., at least one typical effect of the lightening agent is to allow for a lighter colored product to form. The lightening agent could also be called a bleaching agent or bleaching aid.

The lightening agent according to the present invention is selected from phenol sulfide compounds, phosphorous acid, esters of phosphorous acid, and hypophosphite salts. Two or more of these lightening agents may be used in preparing a rosin ester of the present invention. Generally, the lightening agent is present among the reactants in an amount ranging from about 0.1 to about 0.5 wt % based on the weight of the rosin. All of lightening agents (phenol sulfide compounds, phosphorous acid, esters of phosphorous acid, and hypophosphite salts) are known in the art, although they have not previously been applied in the manner according to the present invention.

Representative esters of phosphorous acid (which are also known as phosphite esters) include aliphatic and aromatic esters, where the phosphorous acid may be completely or only partially esterified. Typical phosphite esters which may be employed in the present invention include, without limitation, tris(phenyl)phosphite, tris(p-cresyl)phosphite, tris(2-ethylhexyl)phosphite, tris(nonylphenyl)phosphite and tris(2,4-tert-butyl)phosphite, where tris(nonylphenyl) phosphite and tris(2,4-tert-butyl)-phosphite are two preferred phosphite esters.

Representative hypophosphite salts useful as lightening agents include the sodium, calcium and magnesium-containing salts. The sodium salt, also known as sodium hypophosphite, is a preferred salt.

Each of phosphorous acid, esters of phosphorous acid and hypophosphite salts are well-known materials of commerce, available in bulk quantities. One supplier of these lightening agents is Aldrich Chemical Co. (Milwaukee, Minn.).

The phenol sulfide compound contains both phenolic groups (i.e., hydroxyl group bonded to an aromatic ring) and sulfide groups (i.e., sulfur atoms bonded to at least one carbon atom). A preferred phenol sulfide compound has the formula

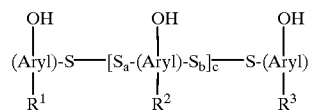

where the Aryl group can be phenyl or naphthyl, R$^1$, R$^2$ and R$^3$ can be the same or different and are hydrocarbon (also known as hydrocarbyl) groups, where "a" and "b" are independently 0, 1 or 2, and where "c" is an integer between 0 and 20. A preferred phenol sulfide compound is an amylphenol disulfide polymer (CAS Registry No. 68555-98-6), where such a polymer is available from Elf Atochem North America Inc., Philadelphia, Pa., as VULTAC™ 2. Another suitable phenol sulfide compound is VULTAC™ 7, also available from Elf Atochem. These phenol sulfide compounds are not "phenolic compounds" according to the present invention. The phenolic compounds used as reactants herein preferably do not contain sulfur.

The phenol sulfide compound is suitably added to the reactants at a concentration of about 0.05 wt % to about 0.5 wt %, based on the total weight of the reactants, in order to provide the desired lightening effect. Preferably the phenol sulfide compound is added to the molten reaction mixture soon after all of the rosin, phenolic compound, formaldehyde or a reactive equivalent thereof, and non-phenolic hydroxyl-containing organic compound are present in the reaction vessel. These reactants may, or may not, have undergone chemical reactions prior to the addition of the lightening agent. The lightening agent, and particularly the phenol sulfide compound, is believed to afford oxidative stability to the rosin ester, as well as bleaching during formation of the light-colored phenolic-modified rosin ester.

In order to provide a tackifier-grade light-colored phenolic-modified rosin ester according to the present invention, it is important to control the relative amounts of formaldehyde (or reactive equivalent thereof) and phenolic compound. These two reactants will readily react with one another and form an oligomeric or polymeric substance. Depending on the relative amounts of the two reactants, the molecular weight of the oligomeric/polymeric substance, and the number average molecular weight of the light-colored phenolic-modified rosin ester prepared therefrom, will range from very high to very low. Variation in the relative amounts of formaldehyde (or reactive equivalent thereof) and phenolic compound will also have a significant effect on the color of the final rosin ester.

According to the present invention, the formaldehyde or reactive equivalent is present (i.e., added to the reaction mixture) in an amount ranging from about 1.1 to about 3.5 equivalents of —CHO moieties per 1 equivalent of Ar—OH moiety of the phenolic compound. Preferably, the formaldehyde or reactive equivalent thereof is present in an amount ranging from about 1.8 to about 2.5 equivalents of —CHO moieties per equivalent of Ar—OH moiety of the phenolic compound. When the equivalent ratio of formaldehyde to phenolic hydroxyl moiety increases beyond about 3.5, the molecular weight of the light-colored phenolic-modified rosin ester becomes undesirably high, with a concomitant decrease in the compatibility of the rosin ester and the adhesive polymer. In addition, as this equivalent ratio increases, the rosin ester has a darker color.

It is also desirable to control the relative amounts of rosin and non-phenolic hydroxyl-containing organic compound present among the reactants. This ratio will effect, for example, the acid number of the final light-colored phenolic-modified rosin ester. The acid number is desirably low, typically less than about 25, and accordingly. To achieve a product with a low acid number, the reactants should contain approximately as many hydroxyl groups from the polyhydric compound as there are acid groups from the rosin. Thus, in a preferred embodiment, the reaction mixture contains (ie., has added to it) about 0.9 to about 1.3 equivalents of —OH group from the non-phenolic hydroxyl-containing organic compound per equivalent of —COOH group of the rosin.

In a preferred embodiment, the amount of formaldehyde or reactive equivalent thereof present in the reaction mixture is determined by reference to the amount of rosin that is also present in the reaction mixture. Typically, the reactants will be charged to the reaction mixture (i.e., the reaction mixture will contain) such that there are from about 0.3 to about 1.5 equivalents of —CHO moiety from the formaldehyde or reactive equivalent for every one equivalent of —COOH moiety from the rosin.

The present invention provides resins, and processes for manufacturing resins, which contain rosin as a major raw material. In a preferred process, the rosin is present among the reactants in an amount ranging from about 60 to about 80 wt % based on the combined weight of the reactants.

The phenolic compound is typically used in a minor amount among the various reactants. In a preferred embodiment, the phenolic compound constitutes from about 5 to about 25 wt % based on the combined weight of the reactants.

The formaldehyde or reactive equivalent thereof is also typically used in a minor amount, among the various reactants. In a preferred embodiment, the formaldehyde or reactive equivalent thereof is paraformaldehyde (paraform), and the formaldehyde or paraform is present in an amount ranging from about 2.5 to about 8.0 wt %, more preferably from about 2.5 to about 5.5 wt %, based on the combined weight of the reactants. The higher values (about 8.0 wt %) are generally preferred when the non-phenolic hydroxyl-containing organic compound is dihydic.

The non-phenolic hydroxyl-containing organic compound is also typically used in a minor amount, among the various reactants. In a preferred embodiment, the polyhydric compound has 1–6 hydroxyl groups, more preferably 2–6 hydroxyl groups, and is present in an amount ranging from about 5 to about 15 wt % based on the combined weight of the reactants.

The relative amounts of the various reactants used in preparing a light-colored phenolic-modified rosin ester of the present invention will affect the molecular weight of the rosin ester. Preferably, the molecular weight of the ester is "low", where for purposes of the present invention, a low molecular weight refers to a number average molecular weight of less than about 5,000. More preferably, the number average molecular weight is less than about 4,000, and still more preferably is less than about 3,000. The molecular weight will typically be greater than about 700. When a resole resin is employed in the preparation of the rosin ester, the resole resin will be selected to have a number average molecular weight that provides a low molecular weight rosin ester of the present invention.

The number average molecular weights of the light-colored phenolic-modified rosin esters are measured by dissolving the ester in a suitable solvent, e.g., tetrahydrofuran, and subjecting a sample of that solution to gel permeation chromatography (gpc) analysis. The retention time and elution profile of the components of the rosin ester, as compared to the retention time and elution profile of polystyrene standards of known molecular weight (available from many chromatography supply houses, e.g., Sepulco, Inc. or Waters Associates), provides number average molecular weight data for the rosin esters of the present invention.

A low molecular weight for the light-colored phenolic-modified rosin ester has been found desirable in order to enhance the compatibility of the rosin ester with adhesive polymers (e.g., ethyl vinyl acetate copolymers). With enhanced compatibility between the rosin ester and adhesive polymer, a mixture of these two materials will display less tendency to form separate domains, i.e., the mixture will have less tendency to spontaneously separate into domains of rosin ester and/or domains of adhesive polymer. The formation of small domains causes the mixture to become non-tacky, while the formation of large domains causes the mixture to appear cloudy. When the compatibility of the rosin ester and adhesive polymer increases, there is greater latitude in creating effective adhesive formulations using these components. Thus, as the compatibility between the rosin ester and adhesive polymer increases, the effectiveness and commercial viability of an adhesive formed from these materials will typically increase.

As an optional component, the reaction between the rosin, a phenolic compound, formaldehyde or a reactive equivalent thereof, and non-phenolic hydroxyl-containing organic compound may occur in the presence of a condensation catalyst. The condensation catalyst is a chemical that will accelerate the rate of condensation (i.e., chemical reactions that generate water) between the reactants. In particular, the condensation catalyst may accelerate the rate of the in situ formation of the resole resin (from the phenolic compound and the formaldehyde or reactive equivalent) and/or ester bonds between the carboxylic acid moieties of rosin and the hydroxyl groups on the other reactants.

Suitable condensation catalysts include calcium bis (monoethyl(3,5-di-tert-butyl-4-hydroxybenzyl) phosphonate), tris(nonylphenyl)phosphite, and strongly basic materials. Preferred condensation catalysts are the salts of a metal such as sodium, lithium, calcium, magnesium and zinc. The salts may be the acetate, carbonate, bicarbonate, formate, hydroxide, oxalate or oxide of a metal. Calcium hydroxide. magnesium oxide, magnesium carbonate, magnesium bicarbonate, magnesium acetate, magnesium formate and magnesium oxalate are preferred.

One or more condensation catalysts may be added to the reactants. The condensation catalyst should be added to the reactants in an effective amount, that is, an amount effective to accelerate the condensation reactions that occur among the reactants. The progress of the condensation reactions may be monitored by periodically measuring the acid number of the mixture. Typically, the condensation catalyst is added in an amount ranging from about 0.01 to 3 wt %, based on the total weight of the reactants.

The light-colored phenolic-modified rosin esters of the present invention are preferably suitable for use as tackifiers. To this end, at least one of an antioxidant or a UV stabilizer is preferably combined with the light-colored phenolic-modified rosin ester, in order to impart greater oxidative, and consequently color, stability to the final product.

Suitable stabilizers, which may be present in up to about 1 wt % based on the weight of the light-colored phenolic-modified rosin ester, include one or more of IRGANOX™ 565 (CAS #991-84-4), which is 4-(4,6-bis(octylthio)-s-triazin-2-yl)amino-2,6-di-tert-butylphenol, IRGANOX™ 1010 (CAS 6683-19-8) which is tetrakis (methylene(3,5-di-tert-butyl-4-hydroxyhydrocinnamate))methal or [IRGANOX™ 1520 (CAS 110553-27-0) which is 2-methyl4,6-bis{(octylthio)methyl}phenol, all of which may be obtained from Ciba Specialty Chemicals (Tarrytown, N.Y.). ULTRANOX™ 257, which is the reaction products of 4-methylphenol with dicyclopentadiene and isobutylene (CAS #68610-51-5) and ULTRANOX™ 236 (CAS 96-69-5) which is 4,4'-thio-bis-(2-tertiary-butyl-5-methylphenol) may be obtained from GE Specialty Chemicals, Parkersburg, W. Va. WESTON™ 618 stabilizer, which is distearyl pentaerythritol diphosphite (CAS #3806-34-6) may be obtained from GE Specialty Chemicals, Morgantown, W. Va.

The resins of the invention may be prepared by reacting together reactants including (A) rosin; (B) phenolic compound; (C) formaldehyde or equivalent; and (D) non-phenolic hydroxyl-containing organic compound, in the presence of (E) a lightening agent, where each of these materials has been described above. In addition, optional components may be used to form a resin of the invention, where preferred optional components, such as a condensation catalyst, have also been described above. Essentially any reaction conditions recognized in the art for preparing rosin-modified phenolic resin (including derivatives thereof) may be employed to prepare a resin of the present invention, where the present invention provides that a lightening agent be included during some stage of the reaction, and the formaldehyde or reactive equivalent thereof be present in an amount ranging from about 1.1 to about 3.5 equivalents of —CHO moieties per 1 equivalent of Ar—OH moiety of the phenolic compound.

As used herein, the term "reacting" or "reacting together" means that each of the listed reactants is added to a reaction vessel under reaction conditions such that each reactant reacts with either a) another reactant component, or b) a reaction product formed from two or more other reactant components. In order for the reactants to undergo a resin-forming reaction, combinations of the reactants must be exposed to an elevated temperature in the range of 100–300° C. At these elevated temperatures, the reactants undergo covalent bond-forming reactions with other reactants, so that a resinous material is formed.

For example, each of the reactants may be combined in a single reaction vessel, and the combination taken to elevated temperature so that the reactants react with one another to form a light-colored phenolic-modified rosin ester of the invention. This approach may be termed a "one-pot" reaction process.

Alternatively, two or more (but less than all) reactants may be combined in a single reaction vessel, and this combination taken to elevated temperature so that the reactants react with one another to form an intermediate reaction product. Then other reactants are reacted with the intermediate reaction product (in either the same or a different reaction vessel). For example, a "two stage" process of condensation may be employed, wherein the phenolic compound, formaldehyde or a reactive equivalent thereof, and rosin are heated together at 100–150° C. Then the mixture is heated to 230–280° C. for esterification of the rosin with the non-phenolic hydroxyl-containing organic compound. As another alternative, a pre-formed resole resin can be obtained from various vendors, and this is then combined with the other reactants in a "one-stage" process.

Rather than purchase the resole resin, it may be synthesized prior to the preparation of the light-colored phenolic-modified rosin ester. The phenolic compound and the formaldehyde or equivalent thereof may be reacted together to form a resole-type phenolic resin in accordance with known methods. Typical reaction conditions to form a phenolic resin are to combine the phenolic compound and formaldehyde or equivalent in the presence of a catalyst, preferably a basic catalyst such as sodium hydroxide. The combination is then taken to elevated temperature, typically between 50° C. and 1 60° C., preferably 60° C. to 100° C., under normal pressure or elevated pressure in an autoclave. The resulting phenolic resin can then be combined with the other reactants, in an amount corresponding to the total amount of phenolic compound and formaldehyde or equivalent that would otherwise be used. Such phenol-formaldehyde resins are well known in the art, and are even commercially available. Preferably, the molecular weight of the phenol-formaldehyde resin is relatively low. Suitable low-molecular weight phenol-formaldehyde resins made using basic catalysts are known in the art as "resole" resins, and may be employed in the present invention.

Thus, the invention provides that the reactants may be reacted with one another in any order, at temperatures within the range of 100–300° C. to obtain a light-colored phenolic-modified rosin ester of the invention. It should be recognized however that the same reactants (in terms of quantity and identity) may form resins with different properties, depending on the precise manner in which the reactants are reacted together.

Exemplary components and processes to prepare light-colored phenolic modified rosin esters of the invention are set forth in the Examples below. In a preferred process, a reaction flask is charged with rosin and non-phenolic hydroxyl-containing compound. This mixture is then heated to achieve a molten, homogenous state. Typically, a temperature of about 150° C. and a time of less than one hour is sufficient to achieve a molten homogeneous state.

The reactants are preferably combined under an inert atmosphere, so that oxidation of the reactants is minimized. This mixture is preferably maintained under a nitrogen atmosphere (preferably a blanket of nitrogen rather than a purge) in order to minimize air oxidation of the components. After this combination has become homogenous, it is cooled to about 115–120° C. (a higher temperature being necessary if the phenolic component possesses a melting point higher than 115° C.). and then the phenolic reactant and the formaldehyde or equivalent are added while the reacting mixture is agitated. At this point, the lightening agent, and optionally a condensation catalyst, may be added.

The temperature is then gradually raised, while the various reactants react together. Typically, water which is formed during the reaction is collected with the aid of a nitrogen purge. A temperature of about 260–275° C. is ultimately reached and maintained, with collection of evolving water, until the acid number of the reacting mixture reaches less than about 25. A vacuum may be applied toward the end of the reaction, to pull off excess water and assist in driving the acid number of the reaction mixture to a desirably low value.

Alternative reactant charging procedures and temperature profiles may be employed to prepare a resin of the invention. It is typically necessary however for the reacting components to be held for some time within the temperature range of about 230° C. to about 280° C., in order for the bulk of the hydroxyl and carboxyl groups to react with one another (esterify), and the acid number to reach a desirably low number. Some mechanism to remove the water formed by the reaction is also typically necessary, where a nitrogen purge through the reacting mixture, and/or adding an organic solvent to the mixture to provide for azeotropic distillation of a water-containing mixture, and/or reduced pressure may be employed for this purpose.

The reaction temperature(s) is selected with the following points in mind. The reaction temperature must be high enough that the contents of the reaction vessel are sufficiently fluid to allow those contents to be stirred. Higher temperatures are generally preferred for reasons of economy, in order to provide a faster rate of reaction. However, the reaction temperature should not be so great that the reaction components boil out of the reaction vessel. Nor should the temperature be so great that decomposition of the reaction components or reaction products should occur.

The resin forming reaction is preferably conducted in the absence of organic solvent. Under solventless reaction conditions, the reaction temperature must be above the melting point of the reaction components and/or reaction product. This factor sets a lower practical reaction temperature of at least about 100° C. A temperature of about 100–130° C. is a good initial temperature for the phenol-modified rosin ester-forming reaction.

The resin-forming reaction generates water as a byproduct of the covalent bonds that are formed between the reactants. In order to drive the reaction toward completion, this water should be removed. In the absence of vacuum or azeotrope formation, a reaction temperatures of at least 100° C. is needed in order to distill water away from the reacting components. Thus, at least during the initial stage(s) of resin formation, the reaction temperature is desirably set to about 100–130° C. While a higher initial reaction temperature may be used, the consequence may be water generation at a rate which is much greater than water removal may be conveniently accomplished.

As the resin-forming reaction proceeds, the molecular weight of the product increases. In a preferred embodiment of the invention, this reaction product may have a melting point of about 110° C. Thus, in order to maintain the contents of the reaction vessel in a fluid state, it is necessary to have the reaction temperature above the melting point of the product resin.

In order to achieve complete reaction, it is typically necessary to raise the temperature to about 250–300° C. While reaction temperatures higher than 300° C. might be used, degradation of the reaction product becomes a significant problem, and thus such higher temperatures are preferably avoided. Therefore, after some time at about 100–150° C., the contents of the reaction vessel are gradually heated to about 250–300° C., with collection of water that is formed as a byproduct of the reaction.

In order to drive the reaction to completion, removal of water may be enhanced through addition of an organic solvent which forms a low-boiling azeotrope with water, and/or the addition of a light vacuum on the reaction vessel. To provide a low-boiling azeotrope, an organic solvent which forms an azeotrope with water. e.g., toluene or xylene, is added to the reaction vessel, and then removed by distillation, initially under normal pressure, and at the end under vacuum at pressures of between 1000 and 0.1 mbar, preferably 200 to 50 mbar, and temperatures of up to 300° C. preferably of up to 280° C.

The reactants are maintained at about 250–300° C. until the reaction is considered finished. Reaction progress is conveniently monitored by taking samples of the reaction mixture and measuring the acid number of those samples. Initially, the acid number of the reaction mixture may be as high as about 125. The acid number will gradually fall as the resin-forming reaction proceeds. In order to be suitable as a tackifier, the light-colored phenolic-modified rosin ester desirably has an acid number of less than 25, more desirably, less than 15. Melting point (softening point), melt viscosity, and/or solution viscosity measurements may also be made to monitor reaction progress.

The light-colored phenolic-modified rosin ester is preferably lightly colored or colorless. Thus, the light-colored phenolic-modified rosin ester typically has a Gardner color value of less than 7, preferably less than 6, and more preferably less than 5. In one embodiment, the light-colored phenolic-modified rosin ester has a Gardner value of between 4 and 7.

In one embodiment, the present invention provides for an adhesive composition comprising an adhesive polymer and, as a modifier thereof, the light-colored phenolic-modified rosin ester described above. In addition to the rosin ester, the adhesive composition will typically contain an adhesive polymer, also sometimes referred to as an elastomer or polymer component. Suitable adhesive polymers include, without limitation, ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic copolymers and hydrogenated styrenic copolymers. Typically, the adhesive composition will contain significant amounts of both light-colored phenolic-modified rosin ester and adhesive polymer. For example, per 100 parts of light-colored phenolic-modified rosin ester, the adhesive composition may contain 50 to 300 parts of adhesive polymer.

The adhesive composition will typically contain additional ingredients selected from the group of ethylene vinyl acetate copolymer, ethylene n-butyl acrylate copolymer, ethylene methyl acrylate copolymer, polyester, neoprene, urethane, poly(acrylate), ethylene acrylic acid copolymer, polyether ether ketone, polyamide, styrenic copolymers and hydrogenated styrenic copolymers. The adhesive composition may also contain tackifiers other than the light-colored phenolic-modified rosin esters of the invention. These additional ingredients are customarily added to adhesive compositions, and their use is well known in the art.

For example, if the adhesive is intended to serve as a hot melt packaging adhesive, then a wax is a useful additional ingredient. Suitable waxes include, without limitation, microcrystalline wax, paraffin wax, Fischer-Tropsch, vegetable wax and the like. Normally, a wax will be included in the composition in an amount of between 40 and 100 parts wax per 100 parts of the polymer component. If the adhesive is intended for a pressure sensitive adhesive (PSA), then mineral oil may be a useful ingredient. Suitable oils include naphthenic oil, mineral, triglyceride oils and the like. One or more plasticizers may be added to the composition, where suitable plasticizers include, without limitation, esters such as dibutyl phthalate and dioctyl phthalate, chlorinated paraffins. One or more fillers, such as carbon black, titanium oxide and zinc oxide. Extender oils may be present in the composition, where exemplary extender oils include, without limitation, liquid paraffin, castor oil, rape seed oil, mineral oil, and the like. Resins may be present in the composition, where suitable resins include, without limitation, cycloaliphatic hydrocarbon resins, $C_5$ hydrocarbon resins, $C_5/C_9$ hydrocarbon resins, $C_9$ hydrocarbon resins, fully or partially hydrogenated hydrocarbon resins, terpene resins, modified terpene resins (terpene phenol or styrenated terpene), liquid resins, and the like.

The adhesive composition of the present invention may be prepared from the light-colored phenolic-modified rosin ester, adhesive polymer and additional ingredients as described above, using conventional techniques and equipment. For example, the components of the adhesive composition may be blended in a mixer such as a Sigma blade mixer, a twin screw extruder or the like. The adhesive composition may be shaped into a desired form, such as a tape or sheet, by an appropriate technique including extrusion, compression molding, calendaring or the like. The adhesive composition may be applied to a substrate by melting the composition and then using conventional hot melt adhesive application equipment recognized in the art. Suitable substrates include textile fabric, paper, glass, plastic and metal. Typically, about 5 to 50 gsm (grams per square meter) of adhesive composition is applied to a substrate. The adhesive composition is broadly useful as a hot melt adhesive for those applications where hot melt adhesives are currently employed.

The adhesives of the present invention may be employed in the following applications, which are exemplary only: packaging adhesives, bookbinding adhesives, furniture adhesives, textile adhesives, wood-bonding adhesives, disposable (nonwoven) adhesives, consumer adhesives, automotive adhesives, appliance adhesives, footwear adhesives, pressure sensitive adhesives and construction adhesives.

The invention will now be illustrated in more detail by the following non-limiting examples, which demonstrate the advantageous properties of the present invention. Parts and percentages are by weight unless indicated otherwise.

Tall oil rosin (CAS #8050-09-7) was used in the Examples. Unless otherwise indicated, reagents are of standard commercial grade as obtained from chemical supply houses (e.g., Aldrich Chemical, Milwaukee, Wis.). VULTAC™ 2, which is an amylphenol disulfide polymer (CAS #68555-986), was obtained from Elf Atochem North America, Inc., Philadelphia, Pa. (this same phenol sulfide may be obtained and used as a solution in other solvents, and could be used in solvent-free form). IRGANOX™ 1425 catalyst (CAS #65140-91-2), which is calcium bis (monoethyl(3,5-di-tert-butyl-4-hydroxybenzyl) phosphonate), was obtained from Ciba Specialty Chemicals (Tarrytown, N.Y.).

Within this disclosure, regarding reactant stoichiometry, the terms "equivalents" and "equivalent excess" are used, and are intended to have their standard meanings as employed in the art. However, for additional clarity, it is noted that equivalents refer to the number of reactive groups present in a molar quantity of a molecule. Thus, a mole of a monocarboxylic acid (e.g., rosin) has one equivalent of carboxylic acid, a mole of diol (e.g., 1,4-cyclohexanedimethanol) has two equivalents of hydroxyl. A 10% equivalent excess of rosin refers to the fact that 1.1 moles of carboxylic acid groups from rosin are present in the reaction mixture for every 1.0 moles of hydroxyl groups from polyol.

The term "AN" refers to acid number, and may be measured by techniques well known in the art. See, e.g., ASTM D-465 (1982). The term "gsm" refers to grams per square meter. Softening points were measured with a Mettler FP80 Central Processor and a Mettler FP83 HT Dropping point cell with a softening point ring, and are reported below in degrees centigrade.

For greater accuracy, Gardner colors and values were measured on a Spectronic 301 spectrophotometer (Milton Roy, Rochester, N.Y.) set in the absorbance (Abs) mode. The Gardner values are a digital version of the Gardner colors. For example, a Gardner color of 3− is equivalent to a Gardner value to 2.50 to 2.82; and a Gardner color of 3 is equivalent to a Gardner value of 2.83 to 3.17; and a Gardner color of 3+ is equivalent to a Gardner value of 3.17 to 3.49. The Spectronic 301 is a single beam, visible range spectrophotometer that is microprocessor controlled. The wavelength range is 325 to 900 nm with an accuracy of +/−2 nm and wavelength precision of +/−1 nm. The Spectronic 301 has a photometric range of −0.1 to 2.5 Abs units. The Spectronic 301 requires a thirty minute warmup to maintain these ranges accurately and is calibrated annually using Milton Roy Spectronic standards. Wavelength and photometric data were sent to an external computer by a built-in RS-232C port. The external computer interprets the data, absorbance at wavelengths 200 nm to 700 nm in increments of 10 nm based upon the Gardner colors standards. The data is translated using ASTM standard E308 and provides a printout of both Gardner colors and values. The software is available from Paul N. Gardner Company Inc (Pompano Beach, Fla.). The Gardner color values reported in the Examples below were measured on samples of the molten resin, using standard Gardner color sample tubes.

The following examples are provided for purposes of illustration, not limitation.

EXAMPLES

EXAMPLE 1

Rosin Glycerine Formaldehyde Nonyl-Phenolic Resin

Using the reactant amounts set forth in TABLE A, a suitable reaction flask including an inert-gas inlet adapter, a stirring mechanism (mechanical stirrer), and a water-cooled reflux condenser was charged with tall oil rosin and glycerine. These reactants were heated to 150° C. under a nitrogen atmosphere. Then the phenolic compound (see TABLE A) was added to the molten mixture, and the mixture was allowed to cool to 120° C. After the reactants had reached 120° C. paraformaldehyde and magnesium oxide were added, and the reactants were heated under refluxing conditions for four hours. At this point, a condensation catalyst (IRGANOX™ 1425) and lightening agent (VULTAC™ 2, where the weight in grams in the TABLE includes toluene, and the phenol sulfide component of VULTAC™ 2 provide 50 wt % of the VULTAC material) were added, and the temperature was raised to 150° C. where it was maintained for one hour. Thereafter, the temperature was steadily increased over a several hour time period to 275° C. The reaction was maintained at 275° C. until the reaction mixture had the desired acid number. Thereafter, the reaction mixture was placed under light vacuum to remove volatile components, and the mixture was allowed to cool. While the mixture was still molten antioxidant(s) was added and stirring continued for 15 minutes, after which the reaction product was poured from the vessel.

The reaction product (light-colored phenolic-modified rosin ester) had an acid number of 13.8, a softening point of 106.2° C., and a Gardner value of 5.75.

TABLE A

PHENOLIC-MODIFIED ROSIN ESTER FORMULATION

| MATERIALS | WEIGHTS (GRAMS) |
|---|---|
| Tall oil rosin | 1900.00 |
| Glycerine | 215.10 |
| IRGANOX ™ 1425 | 3.46 |
| VULTAC ™ 2 | 9.22 |
| Nonyl Phenol | 516.72 |
| Paraformaldehyde | 142.07 |
| Magnesium Oxide | 0.28 |
| Antioxidant | 6.98 |

EXAMPLE 2

Rosin Glycerine Formaldehyde Nonyl-Phenolic Resin

The procedure described in Example 1 was identically followed, using the reactant amounts set forth in TABLE B. The reaction product (light-colored phenolic modified rosin ester) had an acid number of 10.2, a softening point of 98.0° C. and a Gardner value of 5.48.

TABLE B

PHENOLIC-MODIFIED ROSIN ESTER FORMULATION

| MATERIALS | WEIGHTS (GRAMS) |
|---|---|
| Tall oil rosin | 2000.00 |
| Glycerine | 226.43 |
| IRGANOX ™ 1425 | 3.30 |
| VULTAC ™ 2 | 8.79 |
| Nonyl Phenol | 328.50 |
| Paraformaldehyde | 90.32 |
| Magnesium Oxide | 0.27 |
| Antioxidant | 6.66 |

EXAMPLE 3

Rosin Glycerine Formaldehyde T-Butyl-Phenolic Resin

The procedure described in Example 1 was identically followed, using the reactant amounts set forth in TABLE C.

The reaction product (light-colored phenolic modified rosin ester) had an acid number of 7.4, a softening point of 109.9° C. and a Gardner value of 5.43.

TABLE C

PHENOLIC-MODIFIED ROSIN ESTER FORMULATION

| MATERIALS | WEIGHTS (GRAMS) |
|---|---|
| Tall oil rosin | 2000.00 |
| Glycerine | 226.43 |
| IRGANOX ™ 1425 | 3.30 |
| VULTAC ™ 2 | 8.79 |
| t-Butyl Phenol | 328.50 |
| Paraformaldehyde | 90.32 |
| Magnesium Oxide | 0.27 |
| Antioxidant | 6.66 |

EXAMPLE 4

Rosin Glycerine Formaldehyde Nonyl-Phenolic Resin

The procedure described in Example 1 was identically followed, using the reactant amounts set forth in TABLE D. The reaction product (light-colored phenolic modified rosin ester) had an acid number of 17.2, a softening point of 109.3° C. and a Gardner value of 6.53.

TABLE D

PHENOLIC-MODIFIED ROSIN ESTER FORMULATION

| MATERIALS | WEIGHTS (GRAMS) |
|---|---|
| Tall oil rosin | 1900.00 |
| Glycerine | 215.10 |
| IRGANOX ™ 565 | 1.60 |
| VULTAC ™ 2 | 8.52 |
| Nonyl Phenol | 318.30 |
| Paraformaldehyde | 131.27 |
| Magnesium Oxide | 0.26 |
| Antioxidant | 6.45 |

EXAMPLE 5

Rosin Glycerine Formaldehyde T-Butyl-Phenolic Resin

The procedure described in Example 1 was identically followed, using the reactant amounts set forth in TABLE E. The phenolic compound in this example is t-butyl phenol. The reaction product (light-colored phenolic modified rosin ester) had an acid number of 9.22, a softening point of 109.6° C., a Gardner value of 5.93, and had a clear appearance.

TABLE E

PHENOLIC-MODIFIED ROSIN ESTER FORMULATION

| MATERIALS | WEIGHTS (GRAMS) |
|---|---|
| Tall oil rosin | 2100.00 |
| Glycerine | 237.75 |
| IRGANOX ™ 1425 | 1.73 |
| VULTAC ™ 2 | 9.22 |
| Tertiary-butyl Phenol | 344.67 |
| Paraformaldehyde | 94.76 |
| Magnesium Oxide | 0.28 |
| Antioxidant | 6.99 |

EXAMPLE 6

Rosin Glycerine Formaldehyde T-Butyl-Phenolic Resin

The procedure described in Example 1 was identically followed, using the reactant amounts set forth in TABLE F. The phenolic compound in this example is t-butyl phenol, and the non-phenolic hydroxyl-containing organic compound was cyclohexanedimethanol (CHDM). The reaction product (light-colored phenolic modified rosin ester) had an acid number of 22.24, a softening point of 79.3° C., a Gardner value of 4.71, and had a clear appearance.

TABLE F

PHENOLIC-MODIFIED ROSIN ESTER FORMULATION

| MATERIALS | WEIGHTS (GRAMS) |
|---|---|
| Tall oil rosin | 1800.00 |
| CHDM | 478.59 |
| IRGANOX ™ 1425 | 1.69 |
| VULTAC ™ 2 | 8.99 |
| Tertiary-butyl Phenol | 335.95 |
| Paraformaldehyde | 92.37 |
| Magnesium Oxide | 0.27 |
| Antioxidant | 6.81 |

EXAMPLE 7

Rosin Glycerine Formaldehyde T-Butyl-Phenolic Resin

The procedure described in Example 1 was identically followed using the reactant amounts set forth in TABLE G. The reaction was conducted with a polyol equivalent excess of 1.15 (2100 g rosin×1 mol/302 g×1 equivalent/mol=6.95 eq.; 237.7 g glycerin×1 mol/92.1 g×3 equivalents/mol=7.75 eq.; 7.75 equivalents hydroxyl/6.95 equivalents carboxyl= 1.15 equivalent excess of hydroxyl), and a formaldehyde/phenol ratio of 2 (94.92 g paraform×1 mol/30 g=3.2 mol formaldehyde; 236.89 g phenol×1 mol/150.2 g=1.6 mol phenol; 3.2 mol formaldehyde/1.6 mol phenol=2). The reaction product (light-colored phenolic modified rosin ester) had an acid number of 9.0, a softening point of 113.7° C. and a Gardner color, for the molten resin, of 6+.

TABLE G

PHENOLIC-MODIFIED ROSIN ESTER FORMULATION

| MATERIALS | WEIGHTS (GRAMS) | WT. % |
|---|---|---|
| Unitol Tall oil rosin | 2100.00 | 78.11 |
| Glycerine | 237.70 | 8.84 |
| IRGANOX ™ 1425 | 3.23 | 0.12 |
| VULTAC ™ 2 | 4.43 | 0.33 |
| t-Butyl Phenol | 236.89 | 8.81 |
| Paraform | 94.92 | 3.53 |
| Magnesium Oxide | 0.27 | 0.01 |
| Antioxidant | 6.72 | 0.25 |
| TOTAL | 2684.17 | 100.00 |

EXAMPLE 8

Rosin Glycerine Formaldehyde Nonyl-Phenolic Resin

Using the reactant amounts set forth in TABLE H, a suitable reaction flask including an inert-gas inlet adapter, a stirring mechanism (mechanical stirrer), and a water-cooled reflux condenser was charged with tall oil rosin and glycerine. These reactants were heated to 170° C. under a nitrogen atmosphere. Then the magnesium oxide and the phenolic compound (a resole, more specifically, HRJ 13818 from Schenectady Chemicals (Schenectady, N.Y.)) were added to the molten mixture, and the mixture was refluxed for one hour. Then the condensation catalyst (IRGANOX™ 1425) and lightening agent (VULTAC™ 2) were added, and the temperature was raised to 200° C., where it was maintained for one hour. Thereafter, the temperature was steadily increased over a several hour time period to 275° C. The reaction was maintained at 275° C. until the reaction mixture had the desired acid number. Thereafter, the reaction mixture was placed under light vacuum to remove volatile components, and the mixture was allowed to cool. While the mixture was still molten, antioxidant(s) was added and stirring continued for 15 minutes, after which the reaction product was poured from the vessel.

The reaction product (light-colored phenolic-modified rosin ester) had an acid number of 9.76, a softening point of 104.6° C., a Gardner value of 4.89, and a clear appearance.

TABLE H

PHENOLIC-MODIFIED ROSIN ESTER FORMULATION

| MATERIALS | WEIGHTS (GRAMS) |
|---|---|
| Tall oil rosin | 2100.00 |
| Glycerine | 236.82 |
| IRGANOX ™ 1425 | 1.70 |
| VULTAC ™ 2 | 9.05 |
| HRJ ™ 13818 | 386.51 |
| Magnesium Oxide | 0.27 |
| Antioxidant | 6.85 |

EXAMPLE 9

Rosin Glycerine Formaldehyde T-Butyl-Phenolic Resin

The procedure described in Example 8 was identically followed, using the reactant amounts set forth in TABLE 1. The reaction product (light-colored phenolic modified rosin ester) had an acid number of 13.02, a softening point of 122.9° C., a Gardner value of 5.97, and a clear appearance.

TABLE I

PHENOLIC-MODIFIFD ROSIN ESTER FORMULATION

| MATERIALS | WEIGHTS (GRAMS) |
|---|---|
| Tall oil rosin | 2100.00 |
| Glycerine | 236.82 |
| IRGANOX ™ 1425 | 1.70 |
| VULTAC ™ 2 | 9.05 |
| HRJ ™ 1367 (resole) | 386.51 |
| Magnesium Oxide | 0.27 |
| Antioxidant | 6.85 |

EXAMPLE 10

Rosin Glycerine Formaldehyde Nonyl-Phenolic Resin

Using the reactant amounts set forth in TABLE J, a suitable reaction flask including an inert-gas inlet adapter, a stirring mechanism (mechanical stirrer), and a water-cooled reflux condenser was charged with tall oil rosin and 1,6-hexanediol. These reactants were heated to 170° C. under a nitrogen atmosphere. Then the magnesium oxide and the phenolic compound (a resole, more specifically, HRJ 13818 from Schenectady Chemicals (Schenectady, N.Y.)) were added to the molten mixture.,and the mixture was refluxed for one hour at 170° C. Then the condensation catalyst (IRGANOX™ 1425) and lightening agent (VULTAC™ 2) were added, and the temperature was raised to 275° C., where it was maintained until the reaction mixture had the desired acid number. Thereafter, the reaction mixture was placed under light vacuum to remove volatile components, and the mixture was allowed to cool. While the mixture was still molten, antioxidant(s) was added and stirring continued for 15 minutes, after which the reaction product was poured from the vessel.

The reaction product (light-colored phenolic modified rosin ester) had an acid number of 16.48, a softening point of 48.4° C., a Gardner value of 6.10, and a clear appearance.

TABLE J

PHENOLIC-MODIFIED ROSIN ESTER FORMULATION

| MATERIALS | WEIGHTS (GRAMS) |
| --- | --- |
| Tall oil rosin | 1900.00 |
| 1,6-hexanediol | 412.41 |
| IRGANOX ™ 1425 | 1.68 |
| VULTAC ™ 2 | 8.95 |
| HRJ 13818 | 382.47 |
| Magnesium oxide | 0.27 |
| Antioxidant | 6.78 |

COMPARATIVE EXAMPLE 1

Rosin Glycerine Formaldehyde Nonyl-Phenolic Resin

The procedure described in Example 1 was identically followed, using the reactant amounts set forth in TABLE K. In this comparative example, a relatively high amount of paraformaldehyde was employed (paraform/phenol equivalent ratio is 4.5), thus providing a phenolic-modified rosin ester of unacceptably high color. The reaction product (phenolic modified rosin ester) had an acid number of 15.1 a softening point of 120.0° C., and a Gardner value of 7.73.

TABLE K

PHENOLIC-MODIFIED ROSIN ESTER FORMULATION

| MATERIALS | WEIGHTS (GRAMS) |
| --- | --- |
| Tall oil rosin | 1900.00 |
| Glycerine | 215.10 |
| IRGANOX ™ 1425 | 3.31 |
| VULTAC ™ 2 | 8.80 |
| Nonyl Phenol | 328.76 |
| Paraformaldehyde | 203.39 |
| Magnesium Oxide | 0.27 |
| Antioxidant | 6.67 |

EXAMPLE 11

Pressure Sensitive Adhesive Compositions

A. Adhesive Preparation

All adhesives described in this section were mixed using the following equipment: bench top metal-sided heating mantle; paddle type stirring bar, electric variable speed motor; pint-sized can; and electronic temperature controller. The adhesives were prepared in 200 gram batches, according to the formulations of TABLE L. The quantities in TABLE L refer to the parts by weight of each components used to form the adhesive.

The adhesives were compounded by first adding all of the oil (SHELLFLEX™ 371), antioxidant (IRGANOX™ 1010). and rosin phenolic or other resin (except the elastomer) to a pint-sized can. The can was placed in a heating mantle and allowed to heat up to 350° F. under a nitrogen blanket. As soon as the solid resins melted, the resin mixture was agitated by turning on the mixer. When the mixture was completely homogenous and at the 350° F. set point, the thermoplastic rubber (KRATON™ 1107) was slowly added. The rubber was added slowly enough so as not to drop the temperature below 300° F., or cause the rubber particles to mass together. Once the rubber had completely dissolved and been thoroughly mixed into the other components, the adhesive was poured into a silicone lined cardboard box and allowed to cool. The total mix time for the adhesives was between 1 to 4 hours. Mixing continues until the mixture appeared homogeneous.

TABLE L

ADHESIVE FORMULATIONS

| Formulation No.: | 1 | 2 | 3 | 4 | 5 | 6 |
| --- | --- | --- | --- | --- | --- | --- |
| KRATON ™ 1107 | 80 | 80 | 80 | 80 | 80 | 80 |
| IRGANOX ™ 1010 | 2 | 2 | 2 | 2 | 2 | 2 |
| SHELLFLEX ™ 371 | 20 | 20 | 20 | 20 | 20 | 20 |
| UNI-TAC ™ R 85LT | 60 | 60 | 60 | 60 | 60 | 100 |
| Example 1 Rosin Phenolic | 40 | ~ | ~ | ~ | ~ | ~ |
| Example 2 Rosin Phenolic | ~ | 40 | ~ | ~ | ~ | ~ |
| Example 3 Rosin Phenolic | ~ | ~ | 40 | ~ | ~ | ~ |
| NIREZ ™ 2040 | ~ | ~ | ~ | 40 | ~ | ~ |
| UNI-TAC ™ R 100LT | ~ | ~ | ~ | ~ | 40 | ~ |

B. Adhesive Evaluation

The adhesive formulations 1–6 as identified in TABLE L were evaluated according to the following test methods, with the results set forth in TABLEs M and N.

PSTC-1 was used to measure 180 Peels, where SS represents stainless steel, PE represents polyethylene, PP represents polypropylene, and the samples were 1×8 inches. In the TABLEs herein, where indicated, "s" denotes cohesive split, "ss" denotes slight cohesive split, and "c" denotes adhesive failure with no adhesive residue on the test panel. These designations indicate the mode of failure in testing of pressure sensitive adhesive tapes.

More specifically, the designation "c" stands for clean, and refers to the fact that the adhesive failed along the interface of the adhesive to the test panel. This is the most desirable form of failure. It gives an indication of the adhesive's ability to contact the surface and form a bond without allowing a fracture to occur within the mass of the adhesive. Adhesives demonstrating "clean" failure will have a higher cohesive strength (as also indicated by either rheological measurements or shear strength measurements). Basically, since all adhesive remains on the tape face, the internal strength of the adhesive is higher than the adhesion level.

The designation "ss" stands for slight split. This refers to the observation that the adhesive failed cohesively along certain regions of the adhesive mass. A slight split indicates that a fracture in the adhesive mass is able to start but not propagate itself. This mode of failure is not desirable but is better than a full cohesive split ("s", see below). A "ss" failure indicates that the adhesive's cohesive strength is still higher than its adhesion. Most adhesive remains on the tape face with some staining noticeable on the test panel.

The designation "s" stands for split. This refers to an adhesive's tendency to split cohesively. More specifically, "s" means that a fracture in the adhesive starts at the beginning of the adhesive mass and propagates itself throughout the adhesive mass. This observation means that the adhesive's internal strength is weaker than the bond strength to the test panel. Such as result is not desirable as the bond strength will never increase. It also indicates that the static shear of the adhesive will also be poor. A cohesive split leaves equal amounts of adhesive on both the tape face and the test panel.

PSTC-5 was used to measure Loop Tacks, where pli represents pounds/linear inch and the samples were 1×8 inches.

RT Shear and ET Shear refers to static shear testing performed according to PSTC-7, where min represents minutes, RT represents room temperature (ca. 25° C.), and ET represents elevated temperature (65.5° C.). All shear testing was performed at either RT or ET, and the samples evaluated at RT were 0.5×0.5 inches of overlap×1,000 grams, while the samples evaluated at ET were 1×1 inches of overlap×500 grams.

In general, higher values for 180 peels, loop tacks and shear times are preferred.

The performance properties of the adhesive formulations 1–6 are summarized in TABLEs M and N. The data in TABLE M was measured immediately after the adhesives were prepared, while the data in TABLE N was measured after the adhesive formulations 1–6 had been stored for 4 weeks at 50° C. For all adhesives, the mode of failure was "c", i.e., clean, with the exception of formulation 6. which failed by "s" as noted in the TABLEs.

TABLE M

INITIAL PERFORMANCE PROPERTIES

| | Formulation: | | | | | |
|---|---|---|---|---|---|---|
| | 1 Example 1 (18% nonylphenol) | 2 Example 2 (12% nonylphenol) | 3 Example 3 (12% t-butylphenol) | 4 NIREZ ™ 2040 | 5 UNI-TAC ™ R 100LT | 6 No Modifying Resin |
| 180 Degree Peels, SS | 6.1 | 5.1 | 7.1 | 1.5 | 4.8 | 8.9,s |
| 180 Degree Peels, PE | 3.6 | 2.8 | 3.5 | 0.9 | 2.9 | 3.9 |
| 180 Degree Peels, PP | 5.6 | 3.8 | 5.0 | 1.1 | 3.9 | N/A |
| Loop Tacks (pli) | 7.7 | 7.1 | 8.3 | 1.1 | 7.0 | 8.3,s |
| RT Shear (min) | 267.3 | 163.7 | 708.3 | 8251.7 | 284.0 | 25.7 |
| ET Shear (min) | 5.2 | 2.6 | 5.2 | 64.1 | 6.8 | 1.2 |
| Coat Weight (gsm): | 29 | 24 | 30 | 29 | 27 | 25 |

TABLE N

PERFORMANCE PROPERTIES AFTER HEAT AGING

| | Formulation: | | | | |
|---|---|---|---|---|---|
| | 1 Example 1 (18% nonylphenol) | 2 Example 2 (12% nonylphenol) | 3 Example 3 (12% t-butylphenol) | 4 NIREZ ™ 2040 | 5 UNI-TAC ™ R 100LT |
| 180 Degree Peels, SS | 5.5 | 4.9 | 6.2 | NO | 4.5 |
| 180 Degree Peels, PE | 3.9 | 3.3 | 3.7 | TACK | 2.3 |
| 180 Degree Peels, PP | 5.1 | 5.0 | 6.1 | | 3.6 |
| Loop Tacks (pli) | 7.4 | 6.5 | 7.4 | COULD | 6.8 |
| RT Shear (min) | 310.7 | 145.0 | 195.3 | NOT | 183.5 |
| ET Shear (min) | 2.6 | 3.5 | 3.0 | EVALUATE | 6.7 |
| Coat Weight (gsm): | 25 | 24 | 25 | | 23 |

The data of TABLEs M and N demonstrate that the light-colored rosin phenolic resins of the present invention are good tackifier resins, and are even superior to a typical rosin ester (i.e., UNI-TAC™ R 100LT) in terms of better adhesion to low surface energy substrates and room temperature shear. In addition, these good performance properties are retained over time and elevated temperature, to a greater extent than a typical terpene phenolic resin (i.e., NIREZ™ 2040).

EXAMPLE 12

Hot Melt Packaging Adhesive Composition with EnBA

A. Adhesive Preparation

Adhesives were prepared following the procedure set forth in Example 11, using the components (and amounts thereof, in parts by weight of each component) as set forth in TABLE O. Mixing times were on the order of 45–70 minutes for each of the adhesives. In each adhesive as set forth in TABLE O, the polymer component was ethylene n-butyl acrylate copolymer (EnBA). EnBA is available from Exxon Chemical Co. (Houston, Tex.) under their product name ENABLE™ XW-23.AH, and this material was used as the EnBA in TABLE O.

TABLE O

ADHESIVE FORMULATIONS WITH ETHYLENE n-BUTYL ACRYLATE

| Formulation No.: | 7 | 8 | 9 | 10 |
|---|---|---|---|---|
| IRGANOX ™ 1010 | 2 | 2 | 2 | 2 |
| BE SQUARE ™ 185 | 40 | 40 | 40 | 40 |
| EnBA | 60 | 60 | 60 | 60 |
| Example 2 Rosin Phenolic | 100 | ~ | ~ | ~ |
| Example 3 Rosin Phenolic | ~ | 100 | ~ | ~ |
| Example 1 Rosin Phenolic | ~ | ~ | 100 | ~ |
| NIREZ ™ 2040 | ~ | ~ | ~ | 100 |

B. Adhesive Evaluation

The open time ranges of adhesive formulations 7–10 as set forth in TABLE O were evaluated, with the results as set forth in TABLE P. The evaluations were performed as follows: approximately 27 g of an EnBA-based adhesive was placed in a pint can and placed in a 150° C. oven to melt. The film applicator was also placed in the oven to heat up. A section of 4×12 inch cardboard (tablet back) was placed on top of the oven to warm and remove any moisture. The cardboard was then secured on top of a Teflon-coated piece of plywood with a large binder clip. The applicator was removed from the oven and placed onto the cardboard to give a 5 mil film. The molten adhesive was then removed from the oven and a small bead was poured inside the width of the applicator. The applicator, with the molten resin, was then moved with one relatively smooth motion over the length of the cardboard to complete the drawdown. At this time the timer was started and at 2 second intervals a strip (0.5×2 in) of Kraft paper was placed on the film, pressing firmly with the forefinger, fiber side down. This is repeated until the adhesive has set up. After approximately 1 hour each strip was peeled off. Open time, in seconds, was determined by the strip that has 50% of the fiber remaining on the film, according to ASTM D 4497-89. The results from these evaluations are presented in TABLE P.

TABLE P

OPEN TIMES FOR ENBA-BASED ADHESIVES

| Formulation No./Tackifier | Open Time (sec.) |
|---|---|
| No. 8 / Example 3 Rosin Phenolic | 2 |
| No. 7 / Example 2 Rosin Phenolic | 2 |
| No. 9 / Example 1 Rosin Phenolic | 0–2 |
| No. 10 / NIREZ ™ 2040 | 0 |

The data in TABLE P demonstrates that an adhesive composition of the present invention, incorporating a light-colored rosin phenolic resin of the present invention has good open time, generally superior to the open time of adhesives prepared from prior art tackifiers (NIREZ™ 2040).

The Lap Shear performance data for adhesive formulations 7–10 as set forth in TABLE N was evaluated according to the following procedure, which essentially is taken from ASTM D3163-73: on a 1×4 inch ABS sample (rough side up) a line was marked one inch from one of the ends. A small amount of adhesive was melted in a metal dish. The ABS piece was placed on a scale and tared, then 0.4 g of molten adhesive was poured onto the I inch area. Immediately a second 1×4 inch piece of ABS was placed on top (to the 1 inch mark) with moderate pressure. The samples were allowed to equilibrate overnight. The samples were then tested on the Instron. This procedure measures the force (psi) required to produce separation of EnBA formulated adhesive. The results are set forth in TABLE Q, where the Max Load values are the average of 2–4 measurements.

TABLE Q

LAP SHEAR MEASUREMENTS FOR EnBA-BASED ADHESIVES

| Formulation Number Tackifier | Tackifier R&B Softening Point | EnBA Data: Max Load (psi) |
|---|---|---|
| No. 7 Example 2 Rosin Phenolic | 98° C. | 320.9 |
| No. 8 Example 3 Rosin Phenolic | 110° C. | 192.3 |
| No. 9 Example 1 Rosin Phenolic | 106° C. | 321.2 |
| No. 10 NIREZ ™ 2040 | 120° C. | 98.2 |

The data of TABLE Q demonstrates that the rosin esters of the present invention (formulation numbers 7, 8 and 9) impart superior lab shear strength to a representative EnBA-based adhesive formulation than a commercially available tackifier (formulation 10). This superior lab shear strength provides a commercially significant advantage for these adhesives, and the rosin esters contained therein.

EXAMPLE 13

Hot Melt Packaging Adhesive Composition with EVA

A. Adhesive Preparation

Adhesives were prepared following the procedure set forth in Example 12, using the components (and amounts thereof, recorded in parts by weight) as set forth in TABLE R. Mixing times were on the order of 45–70 minutes for each of the adhesives. For the adhesives set forth in TABLE R, the polymer component was ethylene vinyl acetate copolymer (EVA). EVA is available from, for example, Du Pont (Wilmington, Del.), under their ELVAX trademark, including ELVAX™ 220 having MI=150 and 28% VA (vinyl acetate), which was used as the EVA in TABLE R.

TABLE R

ADHESIVE FORMULATIONS WITH ETHYLENE VINYL ACETATE

| Formulation No.: | 11 | 12 | 13 | 14 |
|---|---|---|---|---|
| IRGANOX ™ 1010 | 2 | 2 | 2 | 2 |
| BE SQUARE ™ 185 | 40 | 40 | 40 | 40 |
| ELVAX ™ 220 | 60 | 60 | 60 | 60 |
| Example 2 Rosin Phenolic | 100 | ~ | ~ | ~ |
| Example 3 Rosin Phenolic | ~ | 100 | ~ | ~ |
| Example 1 Rosin Phenolic | ~ | ~ | 100 | ~ |
| NIREZ ™ 2040 | ~ | ~ | ~ | 100 |

B. Adhesive Evaluation

The open time ranges of adhesive formulations 11–14 as set forth in TABLE R were evaluated according to the procedure described in Example 12, with the results as set forth in TABLE S.

TABLE S

OPEN TIMES FOR EVA-BASED ADHESIVES

| Formulation No./Tackifier | Open Time (sec.) |
|---|---|
| No. 11 / Example 2 Rosin Phenolic | 0–2 |
| No. 12 / Example 3 Rosin Phenolic | 0 |
| No. 13 / Example 1 Rosin Phenolic | 2 |
| No. 14 / NIREZ ™ 2040 | 0 |

The data in TABLE S demonstrates that an adhesive composition of the present invention, incorporating a rosin ester of the present invention (and specifically a light-colored phenolic-modified rosin ester) has good open time, comparable and in many instances superior to the open time of adhesives prepared from prior art tackifiers (e.g., NIREZ™ 2040). Longer open time affords an adhesive formulator with increased latitude in preparing an adhesive, and affords an end-user with increased latitude in applying the adhesive to a substrate.

The Lap Shear performance data for adhesive formulations 11–14 as set forth in TABLE R were evaluated according to the procedure described in Example 12, which essentially is taken from ASTM D3163-73. The results are set forth in TABLE T, where the Max Load values are the average of 2–4 measurements.

TABLE T

LAP SHEAR MEASUREMENTS FOR EVA-BASED ADHESIVES

| Formulation Number Tackifier | Tackifier R&B Softening Point | EVA Data: Max Load (psi) |
|---|---|---|
| No. 11 Example 2 Rosin Phenolic | 98° C. | 239.0 |
| No. 12 Bxample 3 Rosin Phenolic | 110° C. | 197.9 |
| No. 13 Example 1 Rosin Phenolic | 106° C. | 253.6 |
| No. 14 NIREZ ™ 2040 | 120° C. | 63.9 |

The data of TABLE T demonstrates that the rosin esters of the present invention (in formulation numbers 11, 12 and 13) impart superior lab shear strength to a representative EVA-based adhesive formulation than a commercially available tackifier (used in formulation number 14). This superior lab shear strength is noteworthy in view of the relatively low softening points of the rosin ester that were used in the adhesives. A lower softening point is generally desirable as it provides the adhesive formulator with greater latitude in formulating the adhesive. Thus, the data in TABLE T demonstrates a commercially significant advantage for the adhesives of the invention, and the rosin esters contained therein.

All publications and patent applications mentioned in this specification are herein incorporated by reference to the same extent as if each individual publication or patent application was specifically and individually incorporated by reference.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A process for preparing a light-colored phenolic-modified rosin ester comprising reacting reactants comprising rosin, a phenolic compound formaldehyde or a reactive equivalent thereof, and a non-phenolic hydroxyl-containing organic compound, in the presence of at least one lightening agent selected from phenol sulfide compounds, phosphorous acid, esters of phosphorous acid, and hypophosphite salts, where the formaldehyde or reactive equivalent is present in an amount ranging from about 1.1 to about 3.5 equivalents of —CHO moieties per 1 equivalent of Ar—OH moiety of the phenolic compound.

2. The process of claim 1 wherein the rosin is present in an amount ranging from about 60 to about 80 wt % based on the combined weight of the reactants.

3. The process of claim 1 wherein the phenolic compound is selected from the group consisting of phenol, $C_{1-22}$alkylphenol and bisphenol-A, and is present in an amount ranging from about 5 to about 25 wt % based on the combined weight of the reactants.

4. The process of claim 1 wherein the reactive equivalent of formaldehyde is paraform, and the formaldehyde or paraform is present in an amount ranging from about 2.5 to about 8.0 wt % based on the combined weight of the reactants.

5. The process of claim 1 wherein the non-phenolic hydroxyl-containing organic compound has 2–6 hydroxyl groups, and is present in an amount ranging from about 5 to about 15 wt % based on the combined weight of the reactants.

6. The process of claim 1 wherein the non-phenolic hydroxyl-containing organic compound is selected from the group consisting of glycerine, pentaerythritol, trimethylolpropane, trimethylolethane, dipentaerythritol, neopentylglycol, cyclohexanedimethanol, ethylene glycol, diethylene glycol, triethylene glycol, and diols of the formula HO—$C_{2-36}$alkylene—OH.

7. The process of claim 1 wherein the non-phenolic hydroxyl-containing organic compound is a dihydric compound of the formula HO—$C_{2-36}$alkylene—OH.

8. The process of claim 1 wherein the non-phenolic hydroxyl-containing organic compound is present in an amount ranging from about 0.9 to about 1.3 equivalents of —OH group per equivalent of —COOH group of the rosin.

9. The process of claim 1 wherein the formaldehyde or reactive equivalent thereof is present in an amount ranging from about 1.1 to about 3.5 equivalents of —CHO moieties per equivalent of Ar—OH moiety of the phenolic compound.

10. The process of claim 1 wherein the formaldehyde or reactive equivalent thereof is present in an amount ranging from about 1.8 to about 2.5 equivalents of —CHO moieties per equivalent of Ar—OH moiety of the phenolic compound.

11. The process of claim 1 wherein the formaldehyde or reactive equivalent thereof is present in an amount ranging from about 0.3 to about 1.5 equivalents of —CHO moiety per equivalent of —COOH moiety of the rosin.

12. The process of claim 1 wherein the lightening agent is present in an amount ranging from about 0.1 to about 0.5 wt % based on the weight of the rosin.

13. The process of claim 12 wherein the lightening agent is a phenol sulfide.

14. The process of claim 1 wherein the lightening agent is phosphorous acid or sodium hypophosphite.

15. The process of claim 1 wherein the reactants further comprise a condensation catalyst.

16. The process of claim 15 wherein the condensation catalyst is calcium bis(monoethyl(3,5-di-tert-butyl-4-hydroxybenzyl)phosphonate) or tris(nonylphenyl)-phosphite.

17. The process of claim 15 wherein the condensation catalyst is an alkaline catalyst.

18. The process of claim 17 wherein the alkaline catalyst is magnesium oxide or calcium hydroxide.

19. The process of claim 1 further comprising mixing at least one of an antioxidant or a UV stabilizer with the light-colored phenolic-modified rosin ester.

20. The light-colored phenolic-modified rosin ester prepared by the process of claim 1.

21. The ester of claim 20 having a Gardner color value of less than 7.

22. The ester of claim 20 further comprising at least one of an antioxidant or UV stabilizer.

23. The ester of claim 20 having an acid number of less than 25.

24. The ester of claim 20 having a number average molecular weight of less than about 5,000.

25. An adhesive comprising an adhesive polymer and a light-colored phenolic-modified rosin ester of claim 20.

26. The adhesive of claim 25 wherein the adhesive polymer is selected from the group consisting of isoprene-based block copolymers, butadiene-based block copolymers, hydrogenated block copolymers, ethylene vinyl acetate copolymers, ethylene n-butyl acrylate copolymers, ethylene methyl acrylate copolymers, ethylene propylene rubber. polyisobutylene, polyvinyl acetate, polyethylene, polypropylene, natural rubber, polyester polymers, polyester-based copolymers, hydrogenated or non-hydrogenated styrenic block copolymers, urethane polymers, neoprene polymers, acrylate polymers, acrylate copolymers, styrene butadiene rubbers, ethylene acrylic acid, polyether ether ketones, polyisoprene, butyl rubber, polyamides, and butadiene acrylonitrile rubber.

27. The adhesive of claim 25 wherein the adhesive polymer is selected from the group consisting of ethylene vinyl acetate copolymers, ethylene n-butyl acrylate copolymers, ethylene methyl acrylate copolymers, hydrogenated or nonhydrogenated sytrenic block copolymers, polyester polymers, polyester-based copolymers, urethane polymers, neoprene polymers, acrylate polymers, acrylate copolymers, ethylene acrylic acid, polyether ether ketones and polyamides.

28. The adhesive of claim 25 further comprising an additive selected from the group consisting of waxes, process oils, cycloaliphatic hydrocarbon resins, $C_5$ hydrocarbon resins, $C_5/C_9$ hydocarbon resins, $C_9$ hydocarbon resins, fully hydrogenated hydrocarbon resins, partially hydrogenated hydrocarbon resins, terpene resins, modified terpene resins, plasticizers, liquid resins and other rosin-based esters.

\* \* \* \* \*

UNITED STATES PATENT AND TRADEMARK OFFICE
CERTIFICATE OF CORRECTION

PATENT NO : 6,022,947
DATED : Feb. 8, 2000
INVENTOR(S) : Charles R. Frihart, Kenneth E. Krajca, Brett A. Neumann It is certified that error appears in the above-identified patent and that said Letters Patent is hereby corrected as shown below:

Column 28, Claim 26, Line 13, "ethylene propylene rubber. polyisobutylene" should read - -ethylene propylene rubber, polyisobutylene- -

Signed and Sealed this

Sixth Day of February, 2001

Attest:

Attesting Officer

Q. TODD DICKINSON

Director of Patents and Trademarks